Nov. 23, 1965     M. G. McBRIDE ETAL     3,218,859

TEMPERATURE MEASURING SYSTEMS

Filed Feb. 15, 1961

United States Patent Office 3,218,859
Patented Nov. 23, 1965

3,218,859
TEMPERATURE MEASURING SYSTEMS
Maurice Graham McBride, Barnet, and Derek Granville Wildish, Harlow, England, assignors to Sangamo Weston Limited, Enfield, England, a British company
Filed Feb. 15, 1961, Ser. No. 89,457
Claims priority, application Great Britain, Feb. 17, 1960, 5,645/60
11 Claims. (Cl. 73—341)

This invention relates to electrical measuring systems for providing a measurement indication representing the sum or difference of two temperatures or physical quantities or values capable of being represented by temperatures and is more particularly concerned with arrangements suitable for providing a continuous measurement indication representing the continuously varying solution value of an equation of the general form $S = x \pm n(y - z)$ where $x$ and $y$ are variable temperature values and $n$ and $z$ are constants.

A particular, although not exclusive, application of the invention is to the simultaneous measurement of a plurality of temperatures in a jet engine, particularly one of the by-pass type, in an aircraft and the provision of an indication at a relatively remote position within such aircraft which is related in complex manner to such measured temperatures. An example of such measurements and the corresponding related indication is that where it is necessary to measure simultaneously both the tail pipe exhaust gas temperature and the compressor air intake temperature of a jet engine and then to provide, at a relatively distant point, an indicated temperature $T_I$ such that $T_I = T_{tp} - n \, (T_{ci} - 15)$ where $T_{tp}$ is the measured tail pipe exhaust gas temperature, $T_{ci}$ is the measured compressor air intake temperature and $n$ is a factor of value less than unity and characteristic of the particular engine concerned in the measurements. The temperatures are assumed to be in ° C. and the factor 15 quoted above results from the requirement that the value of $T_I$ for a particular combustion temperature be based upon a standard or reference temperature of 15° C. Any other reference temperature may obviously be selected without affecting the principles of the invention. If the reference temperature is zero, the equation quoted obviously reduces to the form $S = x \pm n(y)$.

One object of the present invention is to provide an electrical arrangement for giving a measurement indication which represents the sum of a first temperature and a fractional part of a second temperature and which comprises first and second thermocouple devices for subjection respectively to said first and second temperatures, and electric current indicator, means for applying the output of said first thermocouple device and the output of said second thermocouple device in series-aiding sense to said indicator, the respective thermocouple devices comprising junctions of materials of suitably different thermo-electric power values in accordance with the fractional relationship of said second temperature to said first temperature, one material of one of said thermocouple devices being the same as and connected to one of the junctions of the second thermocouple device through a connecting lead of such one material.

Another object of the present invention is to provide an electrical arrangement for affording a continuous measurement indication representative of the continuously variable solution value S of an equation of the general form $S = x \pm n(y)$ where $x$ and $y$ are variable temperature values and $n$ is a constant, which arrangement comprises a first thermocouple device for subjection to temperature $x$ at a first physical position, said first thermocouple device having a first themojunction between an element of a first material and an element of a second material, a second thermocouple device for subjection to temperature $y$ at a second physical position different said first physical position, said second thermocouple device having a second thermojunction between an element of said first material and an element of a third material and a third thermojunction between an element of said second material and an element of a fourth material, a first connecting lead between said first material element of said first thermojunction and said first material element of said second thermojunction, said connecting lead being wholly of said first material, a second connecting lead between said second material element of said first thermojunction and said second material element of said third thermojunction, said second connecting lead being wholly of said second material, an electric current operated device having first and second input terminals, a third connecting lead between said third material element of said second thermojunction and said first input terminal of said current operated device, said third connecting lead being wholly of said third material and a fourth connecting lead between said fourth material element of said third thermocouple device and said second input terminal of said current operated device, said fourth connecting lead being wholly of said fourth material, said first, second, third and fourth materials being so chosen that the thermoelectric power of said first and third materials is $p$ times the thermoelectric power of said first and second materials and the thermoelectric power of said fourth and second materials is $q$ times the thermoelectric power of said first and second materials where the sum of said factors $p$ and $q$ is equal to said factor $n$.

Yet another object of the invention is the provision of an electrical arrangement affording a continuous measurement indication representative of the continuously variable solution value S of an equation of the general form $S = x \pm n(y)$ where $x$ and $y$ are variable temperature values and $n$ is a constant, which arrangement comprises a first thermocouple device for subjection to temperature $x$ at a first physical position, said first thermocouple device having a first thermojunction between an element of a first material and an element of a second material, a second thermocouple device for subjection to temperature $y$ at a second physical position different from said first physical position, said second thermocouple device having a second thermojunction between an element of said second material and an element of a third material, a first connecting lead between said second material elements of said first and second thermojunctions, said first connecting lead being wholly of said second materials, an electric current operated device having first and second input terminals, a second connecting lead between said first material element of said first thermojunction and said first input terminal of said current operated device and a third connecting lead between said third material element of said second thermocouple device and said second input terminal of said current operated device, said first, second and third materials being so chosen that the thermoelectric power of the third and second materials is equal to $n$ times the thermo electric power of the first and third materials.

In order that the various features, objects and advantages of the invention may be more readily understood a number of different embodiments thereof will now be described with reference to the accompanying drawing and wherein.

By way of illustrative example each of the embodiments to be described will be assumed to be operative to indicate a temperature $T_I$ such that $$T_I = T_{tp} - n(T_{ci} - 15)$$

as already referred to and defined above.

Figure 1:
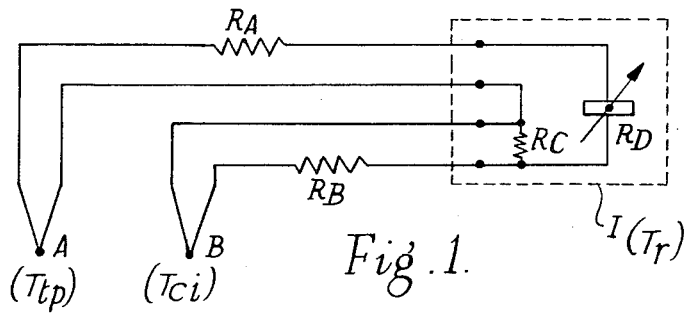
FIGURE 1 shows one known arrangement for providing a measurement indication based upon the tail pipe exhaust gas and compressor air intake temperatures of a jet aircraft engine.

In the arrangement as shown in FIGURE 1, a first thermocouple device A is appropriately disposed on the jet engine to measure its tail pipe temperature $T_{tp}$ while a second thermocouple device B is positioned on the same engine to measure the compressor intake temperature $T_{ci}$. Each of the thermocouples is extended back by way of leads 10, 11 respectively to the indicator I which is at a relatively distant position, e.g. in the control cabin, and is at a reference temperature $T_r$ which may vary. The total resistance values of the thermocouples A and B and their leads 10, 11 back to the indicator I are adjusted respectively to predetermined values $R_A$ and $R_B$. The output of thermocouple B is potential divided by means of a potential dividing network formed by the addition of the shunt resistor $R_C$, the respective resistance values being such that $R_C/R_B + R_C = n$. The output of thermocouple A and the part of the output of thermocouple B which is present across the resistance $R_C$ are connected in series opposition and applied to the coil winding $R_D$ of the indicator I which may be a conventional moving coil measuring instrument.

The total output available to the indicator I is proportional to $T_{tp} - T_1 - n(T_{ci} - T_r)$. The actual indicated temperature $T_I^1$ is therefore $$T_I^1 = T_{tp} - nT_{ci} - (1-n)T_r \quad (1)$$

The required indication temperature $T_I$ is however, $$T_I = T_{tp} - nT_{ci} + n \cdot 15 \quad (2)$$

To correct $T_I^1$ to indicate $T_I$ it is therefore necessary to add $(1-n)T_r$ and $n \cdot 15$. The component $(1-n)T_r$ can be obtained by conventional bimetallic compensation within the indicator I while the component $n \cdot 15$ is a constant addition which can be incorporated in the indicator calibration. This embodiment is a simple one in which different values of $n$ for use with different engines can readily be provided for by adjustment of the resistance $R_C$ and of the temperature compensation and calibration markings of the indicator I. Such arrangement has the disadvantage of requiring a double set of connecting leads (10, 11) between the engine and the relatively distant indication point with consequent increase in weight and resistance although the total external resistance is only about 25% greater than for a single set of extension leads. Copper/constantan compensating leads may be employed from certain points in the circuits of the thermocouples A and B.

Figure 2:
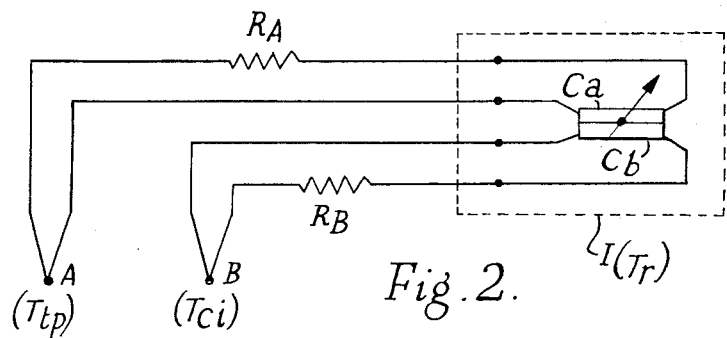
FIGURE 2 shows an alternative known arrangement for providing a measurement indication similar to that of FIGURE 1.

Another arrangement is shown in FIG. 2. This embodiment resembles that of FIG. 1 except for the use of a double winding type of moving coil instrument for the indicator I and the elimination of the potential divider shunt resistance $R_C$. In the double wound moving coil indicating instrument I, the respective coil windings $C_a$ and $C_b$ are so arranged that, with equal potentials applied thereto, the torque produced by winding $C_b$ is $n$ times that of winding $C_a$ and in the opposite direction. The compensation of this alternative arrangement is the same as that already described in connection with FIG. 1.

Figure 3:
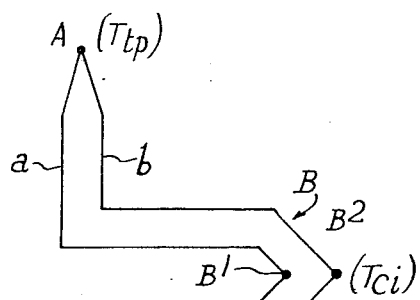
FIGURE 3 shows one arrangement in accordance with the invention and FIGURE 4 another arrangement in accordance with the invention for providing measurement.

In the arrangement shown in FIG. 3, the first thermocouple device A measuring the tail pipe temperature $T_{tp}$ has its junction formed of materials $a$ and $b$ which are also used for the respective connecting leads to the thermocouple device B measuring the compressor intake temperature $T_{ci}$. This latter device is a dual one, the material $a$ from the first thermocouple A being joined to a further material $c$ to form one thermo-junction $B^1$ and the material $b$ from the first thermocouple A being joined to a further material $d$ to form a second thermo-junction $B^2$. The materials $c$ and $d$ are then used for the conductors of the leads $10a$, $11b$ which extend right back to the remote indicator I at the variable reference temperature $T_r$. The indicator I in this instance has a single actuating element, e.g. a conventional moving coil measuring instrument.

It can be shown that if the material $c$ is chosen so that the thermo electric power of the pair $a$ and $c$ is equal to $p$ times the thermo electric power of the pair $a$ and $b$ and if, also the material $d$ is chosen so that the thermo electric power of the pair $d$ and $b$ is equal to $q$ times the thermo electric power of the pair $a$ and $b$, then the arrangement will provide the required temperature indication $T_I = T_{tp} - n(T_{ci} - 15)$ if the sum of the factors $p$ and $q$ is made equal to $n$ and a correction by a constant addition $n \cdot 15$ is incorporated in the indicator calibration since the thermo electric power of $c$ vs. $d$ is then $(1-n)$ times that of $a$ vs. $b$. Bimetallic compensation is provided, as previously, in the instrtument to take care of the component $(1-n)T_r$.

While this third embodiment requires a more complex dual element thermocouple device B at the compressor intake position it has the compensating advantage of requiring only one set of extension leads of materials ($c$ and $d$) back to the, usually more remote, indicator position with resulted saving in weight. With suitable choice of materials $c$ and $d$, such saving of weight may be considerable. One suitable pair of materials is copper and a nickel copper alloy.

Figure 4:
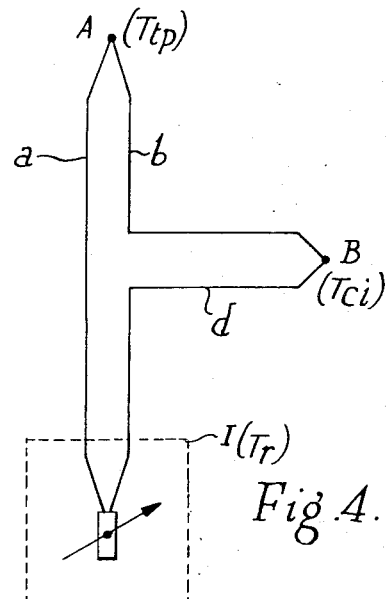

The embodiment shown in FIG. 4 resembles that of FIG. 3 but avoids the use of a dual element thermocouple device B at the compressor intake position. In this arrangement the material $d$ is chosen so that the thermo electric power of the pair $d$ and $b$ is equal to $n$ times the thermo electric power of the pair $a$ and $b$ or, alternatively, so that the thermo electric power of the pair $a$ and $d$ is equal to $1-n$ times the thermo electric power of the pair $a$ and $b$.

In each of the arrangements described the thermocouple device A would normally have a nickel-chromium/nickel-aluminium junction. In the arrangement of FIG. 4, material $a$ would normally be a nickel-aluminium alloy, and material $d$ could then be an alloy of nickel and chromium or possibly iron.

The arrangements of FIGS. 1, 3 and 4 are also applicable to engine control systems by appropriate substitution of electric control apparatus for the indicator I whereby suitable adjustments of various engine operating conditions may be effected automatically.

We claim:

1. An electrical arrangement for providing a continuous measurement indication representing the continuously variable solution value S of an equation of the general form $S = x \pm n(y)$ where $x$ and $y$ are variable temperature values and $n$ is a constant, said arrangement comprising a first thermocouple device for subjection to temperature $x$ at a first physical position, said first thermocouple device having a first thermojunction between an element of a first material and an element of a second material, a second thermocouple device for subjection to temperature $y$ at a second physical position different from said first physical position, said second thermocouple device having a second thermojunction between an element of said first material and an element of a third material and a third thermojunction between an element of said second material and an element of a fourth material, a first connecting lead between said first material element of said first thermojunction and said first material element of said second thermojunction, said connecting lead being wholly of said first material, a second connecting lead between said second material element of said first thermojunction and said second material element of said third thermojunction, said second connecting lead being wholly of said second material, an electric current operated device having first and second input terminals, a third connecting lead between said third material element of said second thermojunction and said first input terminal of said current operated device, said third connecting lead being wholly of said third material and a fourth connecting lead between said fourth material element of said third thermocouple device and said second input terminal of said current operated device, said fourth connecting lead being wholly of said fourth material, said first, second, third and fourth materials being so chosen that the thermoelectric power of said first and third materials is $p$ times the thermoelectric power of said first and second materials and the thermoelectric power of said fourth and second materials is $q$ times the thermoelectric power of said first and second materials where the sum of said factors $p$ and $q$ is equal to said factor $n$.

2. An electrical arrangement for providing a continuous measurement indication representing the continuously variable solution value S of an equation of the general form $S=x\pm n(y)$ where $x$ and $y$ are variable temperature values and $n$ is a constant, said arrangement comprising a first thermocouple device for subjection to temperature $x$ at a first physical position, said first thermocouple device having a first thermojunction between an element of a first material and an element of a second material, a second thermocouple device for subjection to temperature $y$ at a second physical position different from said first physical position, said second thermocouple device having a second thermojunction between an element of said second material and an element of a third material, a first connecting lead between said second material elements of said first and second thermojunctions, said first connecting lead being wholly of said second material, an electric current operated device having first and second input terminals, a second connecting lead between said first material element of said first thermojunction and said first input terminal of said current operated device and a third connecting lead between said third material element of said second thermocouple device and said second input terminal of said current operated device, said first, second and third materials being so chosen that the thermoelectric power of the third and second materials is equal to $n$ times the thermoelectric power of the first and third materials.

3. An electrical arrangement for providing a continuous measurement indication representing the continuously variable solution value S of an equation of the general form $S=x\pm n(y)$ where $x$ and $y$ are variable temperature values and $n$ is a constant, said arrangement comprising a first thermocouple device for subjection to temperature $x$ at a first physical position, said first thermocouple device having a first thermojunction between an element of a first material and an element of a second material, a second thermocouple device for subjection to temperature $y$ at a second physical position different from said first physical position, said second thermocouple device having a second thermojunction between an element of said first material and an element of a third material and a third thermojunction between an element of said second material and an element of a fourth material, a first connecting lead between said first material element of said first thermojunction and said first material element of said second thermojunction, said connecting lead being wholly of said first material, a second connecting lead between said second material element of said first thermojunction and said second material element of said third thermojunction, said second connecting lead being wholly of said second material, a moving coil type indicating device having first and second input terminals, a third connecting lead between said third material element of said second thermojunction and said first input terminal of said indicating device, said third connecting lead being wholly of said third material and a fourth connecting lead between said fourth material element of said third thermocouple device and said second input terminal of said indicating device, said fourth connecting lead being wholly of said fourth material, said first, second, third and fourth materials being so chosen that the thermoelectric power of said first and third materials is $p$ times the thermoelectric power of said first and second materials and the thermoelectric power of said fourth and second materials is $q$ times the thermoelectric power of said first and second materials where the sum of said factors $p$ and $q$ is equal to said factor $n$.

4. An electrical arrangement for providing a continuous measurement indication representing the continuously variable solution value S of an equation of the general form $S=x\pm n(y)$ where $x$ and $y$ are variable temperature values and $n$ is a constant, said arrangement comprising a first thermocouple device for subjection to temperature $x$ at a first physical position, said first thermocouple device having a first thermojunction between an element of a first material and an element of a second material, a second thermocouple device for subjection to temperature $y$ at a second physical position different from said first physical position, said second thermocouple device having a second thermojunction between an element of said second material and an element of a third material, a first connecting lead between said second material elements of said first and second thermojunctions, said first connecting lead being wholly of said second material, a moving coil type indicating device having first and second input terminals, a second connecting lead between said first material element of said first thermojunction and said first input terminal of said indicating device and a third connecting lead between said third material element of said second thermocouple device and said second input terminal of said indicating device, said first, second and third materials being so chosen that the thermoelectric power of the third and second materials is equal to $n$ times the thermoelectric power of the first and third materials.

5. An electrical arrangement for providing a continuous measurement indication representing the continuously variable solution value S of an equation of the form $S=x\pm n(y-z)$ where $x$ and $y$ are variable temperature values and $n$ and $z$ are constants, said arrangement comprising a first thermocouple device for subjection to temperature $x$, a second thermocouple device for subjection to temperature $y$, an electric current operated indicating instrument having first and second input terminals and circuit means for supplying the outputs of said first and second thermocouple devices in series-aiding or series-opposing relationship in accordance with the sign of said factor $n(y-z)$, said first thermocouple comprising a first thermojunction between an element of a first material $a$ and an element of a second material $b$, said second thermocouple device comprising a second thermojunction between an element of said first material $a$ and an element of a third material $c$ and a third thermojunction between an element of said second material $b$ and an element of a fourth material $d$, said circuit means comprising a first connecting lead made wholly of said first material $a$ between said first material elements of said first and second thermojunctions, a second connecting lead of said second material $b$ between said second material elements of said first and third thermojunctions, a third connecting lead of said third material $c$ between said third material element of said second thermojunction and said first terminal of said indicating instrument and a fourth connecting lead of said fourth material $d$ between said fourth material element of said third thermojunction and the second input terminal of said indicating instrument, the said first and third materials $a$ and $c$ having a thermoelectric power equal to $p$ times the thermoelectric power of the first and second materials *a* and *b* and the thermoelectric power of the fourth and second materials *d* and *b* being chosen to be equal to *q* times the thermoelectric power of the first and second materials *a* and *b* when the sum of the said factors *p* and *q* is equal to said equation factor *n* and said indicating instrument including a calibration correction by a constant addition equal to said equation factor *z* and bi-metallic temperature compensation equal to $(1-n)$ times said equation factor *z*.

6. An electrical arrangement for providing a continuous measurement indication representing the continuously variable solution value S of an equation of the form $S = x \pm n(y-z)$ where *x* and *y* are variable temperature values and *n* and *z* are constants, said arrangement comprising a first thermocouple device for subjection to temperature *x*, a second thermocouple device for subjection to temperature *y*, an electric current operated temperature indicating instrument having first and second input terminals and circuit means for supplying the outputs of said first and second thermocouple devices in series-aiding or series-opposing relationship in accordance with the sign of said factor $n(y-z)$, said first thermocouple comprising a first thermojunction between an element of a first material *a* and an element of a second material *b*, said second thermocouple device comprising a second thermojunction between an element of said second material *b* and an element of a third material *d*, said circuit means comprising a first connecting lead of said first material *a* between said first material element of said first thermojunction and the first input terminal of said indicating instrument, a second connecting lead of said second material *b* between said second material elements of said first and second thermojunctions and a third connecting lead of said third material *d* between said third material element of said second thermojunction and said second input terminal of said indicating instrument, the said second and third materials *b* and *d* having a thermoelectric power equal to *n* times the thermoelectric power of the first and second materials *a* and *b* and said indicating instrument including a calibration correction by a constant addition equal to said equation factor *z* and bi-metallic temperature compensation equal to $(1-n)$ times said equation factor *z*.

7. An electrical arrangement according to claim 2 for providing a measurement indication dependent upon the exhaust gas tail-pipe temperature and the compressor air intake temperature of the jet engine in an aircraft upon an electric current operated visual indicator located at a supervision point in said aircraft which is relatively remote from said engine, in which said first thermocouple device is located to sense said tail-pipe exhaust gas temperature and said second thermocouple device is positioned to sense said compressor air intake temperature.

8. An electrical system according to claim 7 in which said first thermoelectric material is a nickel-aluminum alloy, said second thermoelectric material is a first nickel-chromium alloy and said third thermoelectric material is a second nickel-chromium alloy.

9. An electrical system according to claim 7 in which said first thermoelectric material is a nickel-aluminium alloy, said second thermoelectric material is a nickel-chromium alloy and said third thermoelectric material is iron.

10. An electrical arrangement according to claim 1 for providing a measurement indication dependent upon the exhaust gas tail-pipe temperature and the compressor air intake temperature of the jet engine in an aircraft upon an electric current operated visual indicator located at a supervision point in said aircraft which is relatively remote from said engine, in which said first thermocouple device is located to sense said tail-pipe exhaust gas temperature and said second thermocouple device is positioned to sense said compressor air intake temperature.

11. An electrical system according to claim 10 in which said first thermoelectric material is a nickel aluminium alloy, said second thermoelectric material is a nickel chromium alloy, said third thermoelectric material is copper and said fourth thermoelectric material is a nickel-copper alloy.

References Cited by the Examiner

UNITED STATES PATENTS

| | | | |
|---|---|---|---|
| 1,730,308 | 10/1929 | Thwing | 73—359 |
| 1,837,853 | 12/1931 | DeFlorez | 73—359 |
| 2,589,971 | 3/1952 | Skarstrom. | |
| 2,986,935 | 6/1961 | Cupido et al. | 73—341 X |
| 3,007,988 | 11/1961 | Jaffe et al. | 73—359 |
| 3,018,663 | 1/1962 | Dunlop | 73—359 |
| 3,049,012 | 8/1962 | Daniels | 73—359 |

FOREIGN PATENTS 1,069,320   11/1959   Germany.

OTHER REFERENCES

Pages 305 and 306; Temperature, Its Measurement and Control in Science and Industry, published by American Institute of Physics, vol. II, 1955.

ISAAC LISANN, *Primary Examiner.*